_US006007445A_

United States Patent [19]
Kirchhoffer et al.

[11] Patent Number: 6,007,445
[45] Date of Patent: Dec. 28, 1999

[54] STATIC FORWARD AND REVERSE ENGAGEMENT CONTROL SYSTEM FOR A MULTIPLE RATIO AUTOMATIC TRANSMISSION

[75] Inventors: Johann Kirchhoffer, Cologne; Werner Croonen, Bergheim; Thomas Martin, Puhlheim; Eric Reichert, Molsheim; Thomas Wagner, Cologne; Wolfgang Wickler, Bruhl, all of Germany

[73] Assignee: Ford Global Technologies, Inc., Dearborn, Mich.

[21] Appl. No.: 09/017,969

[22] Filed: Feb. 3, 1998

[51] Int. Cl.⁶ ..................................................... F16H 47/04
[52] U.S. Cl. ........................................... 475/116; 475/120
[58] Field of Search ..................................... 475/116, 120, 475/121, 122, 123

[56] References Cited

U.S. PATENT DOCUMENTS

| | | |
|---|---|---|
| 5,376,056 | 12/1994 | Wakahara et al. ....................... 475/123 |
| 5,478,288 | 12/1995 | Sakakibara et al. ................. 475/120 X |
| 5,553,694 | 9/1996 | Schulz et al. . |
| 5,586,029 | 12/1996 | Schulz et al. . |
| 5,612,874 | 3/1997 | Schulz et al. . |
| 5,642,283 | 6/1997 | Schulz et al. . |
| 5,646,842 | 7/1997 | Schulz et al. . |
| 5,768,953 | 6/1998 | Younger ................................ 475/116 X |
| 5,772,550 | 6/1998 | Kmada et al. ........................... 475/120 |
| 5,902,204 | 5/1999 | Takagi .................................. 475/116 X |

Primary Examiner—Charles A Marmor
Assistant Examiner—Roger Pang
Attorney, Agent, or Firm—Frank G. McKenzie; Roger L. May

[57] ABSTRACT

A control valve system for a multiple ratio automatic transmission having a reaction brake for forward drive and a reaction brake for reverse drive. A first clutch establishes a driving connection between an input gear element and a torque input shaft establishes a forward drive torque flow path when the forward drive brake is engaged. A second clutch connects a different torque input gear element of the transmission to the torque input member when the reverse reaction brake is applied. A pressurized valve circuit with three variable force solenoids, including one variable force solenoid, establishes a controlled circuit pressure, a second variable force solenoid is dedicated for reverse engagement control and a third variable force solenoid is dedicated for forward engagement control, whereby independent reverse engagement pressures and independent forward engagement pressures on the clutches and brakes, are established. A neutral idle characteristic conditions the clutches and the brakes for minimal threshold capacity, which effectively interrupts the torque delivery path through the transmission when the torque input shaft is driven at idle speeds.

8 Claims, 13 Drawing Sheets

VARIABLE ENGAGEMENT CONTROL RANGE = VFS 2 CONTROL RANGE − $\frac{F_s}{A\;valve}$ CLIP POINT TO D/3/2/1 IS WHEN
$VFS1\_MOD + \frac{F_s}{A\;valve} \geq VFS2$ VARIABLE ENGAGEMENT CONTROL RANGE = VFS 2 CONTROL RANGE − $\dfrac{Fs}{A\,valve}$ CHANGE OVER POINT CR TO R WHEN
$VFS3 + \dfrac{Fs}{A\,valve} \geq VFS2$ VARIABLE CONTROL RANGE FOR FORWARD ENGAGEMENT = VFS 2 CONTROL RANGE $- \dfrac{Fs}{A\,valve}$

CHANGE OVER POINT FROM VFS1-MOD TO D/3/2/1

$VFS2 \leq VFS.3 + \dfrac{Fs}{A\,valve}$

ENGAGEMENT CONTROL VALVE FORWARD

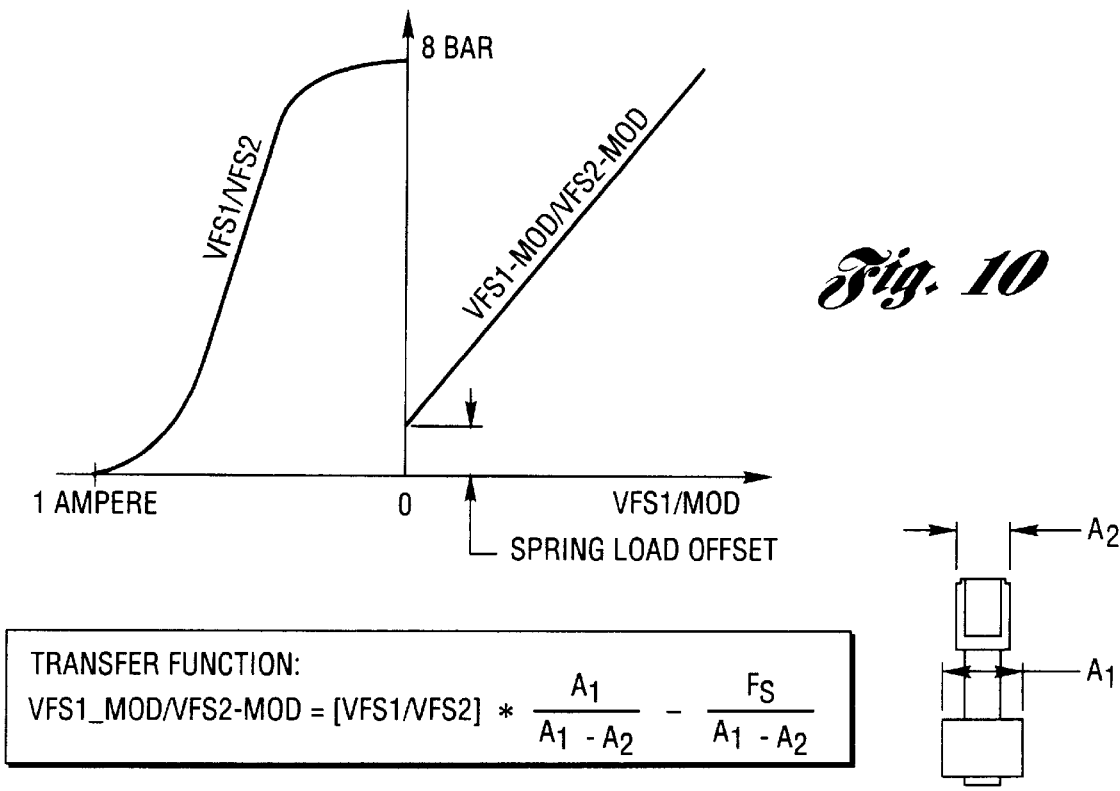
*Fig. 10*
*Fig. 10a*
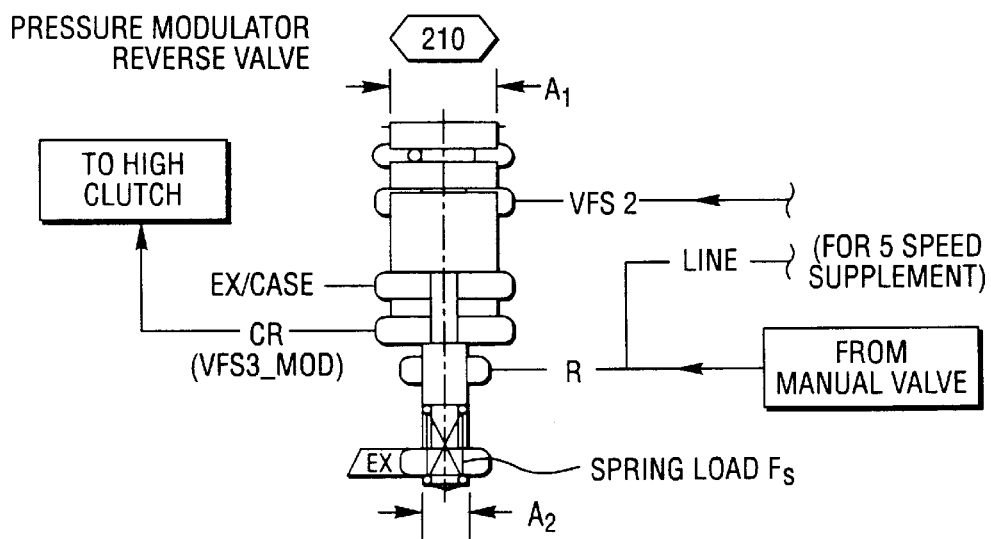
*Fig. 11*

STATIC FORWARD AND REVERSE ENGAGEMENT CONTROL SYSTEM FOR A MULTIPLE RATIO AUTOMATIC TRANSMISSION

TECHNICAL FIELD

The invention relates to an automatic transmission having pressure-operated clutches and brake servos for establishing and disestablishing torque flow paths for forward drive torque delivery and for reverse drive torque delivery.

BACKGROUND OF THE INVENTION

The engagement control system of the present invention has features that are common to the engagement control system of the automatic transmission shown in U.S. Pat. No. 5,612,874, which is assigned to the assignee of the present invention. The transmission of the '874 patent discloses a planetary transmission having a so-called three-speed Simpson gear set and a simple planetary gear set arranged in series. The two gear sets together establish four forward driving ratios and a single reverse ratio. Pressure-operated clutches and brakes establish each of the forward driving ratios and the reverse ratio as they are applied and released under the control of an electronic processor and hydraulic control valve circuit control system.

A hydrokinetic torque converter is disposed between the crankshaft of an internal combustion engine and torque input elements of the transmission. A neutral state is achieved by disengaging a forward drive clutch, thus interrupting the torque flow path between the planetary gearing and the turbine of the torque converter.

When the output shaft speed is zero and the engine is idling, the forward drive clutch is fully engaged. Thus, the torque converter assumes a stall condition and develops stall torque on the turbine as the impeller of the torque converter continues to be driven by the engine at engine idle speed. This imposes a load on the engine, which effectively results in an undesirable power loss because the engine does not develop useful driving power on the output shaft under such stall torque conditions.

The engagement control system disclosed in the '874 patent uses one variable force solenoid and one on/off solenoid for controlling both forward and reverse engagements. The variable force solenoid communicates with a modulator valve for forward engagements and with a separate modulator valve for reverse engagements. Both of these modulator valves modulate line pressure developed by a main regulator valve in the control valve circuit for producing a clutch pressure that starts from zero pressure to a maximum value, thereby allowing a cushioned engagement of the forward and reverse engagements.

For a forward engagement, the forward clutch of the design of the '874 patent, which establishes a driving connection between the turbine and the input element of the gearing, is controlled. For reverse engagements, a separate high speed ratio clutch is controlled simultaneously with the engagement of a separate reverse brake. Separate engagement control valves are used to distribute either line pressure or clutch pressure to the high clutch or to the forward clutch. This is required in order to satisfy the stall torque capacity that is required during forward and reverse accelerations of the vehicle from a standing start.

The reverse engagement control valve of the design of the '874 patent distributes either reverse line pressure or a reverse modulator pressure to the high clutch during reverse engagement depending upon the output pressure of the on/off solenoid and the variable force solenoid pressure. Thus, there is one pressure threshold for changing between the reverse modulator pressure and the line pressure in reverse drive. Similarly, the forward engagement control valve distributes forward clutch pressure or full line pressure, depending upon the mode of operation of the variable force solenoid for controlling forward clutch pressure. An engagement control valve switches the forward clutch pressure to full line pressure after completion of the forward engagement. This is required since the forward modulator valve must be used, following forward engagement, for controlling upshifts and downshifts between gear ratios. Re-application of forward modulator pressure can be achieved only by moving the manual valve under the control of the operator to a neutral position and then re-engaging the forward clutch.

Furthermore, the system of the '874 patent allows only one distinct pressure threshold for the transition from forward drive modulator pressure to line pressure. Thus, a neutral idle function cannot be achieved since the forward drive clutch cannot be disengaged electronically.

Because only one fixed pressure threshold is available, smooth control of high speed forward and reverse engagement is not possible. Further, since only one variable force solenoid is used to control both the forward and reverse engagements, there is no flexibility on the part of the transmission designer for enhancing static engagement quality. Line pressure amplification and engagement control have different design criteria, but they are achieved with only one variable force solenoid.

SUMMARY OF THE INVENTION

The improved engagement control system of the present invention includes three variable force solenoids rather than one. Two of them are used for the purpose of amplifying line pressure. One variable force solenoid is dedicated for controlling reverse engagements and a separate variable force solenoid is dedicated for forward engagement control. The variable force solenoids communicate with pressure modulator valves, which have a multiplexing function to establish variable thresholds for engagement control for reverse drive and engagement control for forward drive by establishing maximum stall capacity and modified engagement control pressures.

For purposes of this disclosure, the term "multiplexing" is used to describe the establishment of two functionally independent control pressures for the clutches and brakes distributed by a single pressure control valve, which in this case are the outputs of the pressure modulator valves to the clutches and brakes for reverse engagement and for forward engagement.

Alternate versions for reverse engagement control and for forward engagement control are provided depending upon whether the gearing is characterized by an overrunning coupling for establishing a torque reaction point for the Simpson gear set or whether the reaction point for the Simpson gear set is established by a pressure-operated friction brake.

The electronically controlled clutch engagement feature of the present invention, unlike the engagement control system of the '874 patent, is capable of achieving smooth static engagements with high engine torques and high engine speeds even though the line pressure is high. An uncomfortable and harsh engagement is avoided because of the use of three variable force solenoids rather than only one variable force solenoid and one on/off solenoid for controlling all engagements in reverse drive and forward drive.

The neutral idle feature of the invention reduces load on the engine under some operating modes regardless of whether the vehicle is standing still or is moving. The engine throttle, in either event, is closed when the engine operates at idle speed.

The reduced engine load during the neutral idle state requires partial engagement of the forward clutch. A minimal slip across the forward clutch is controlled based on the vehicle operating mode. The idle speed control system for the engine then can set the air/fuel ratio at a leaner setting, which results in improved engine fuel economy.

Ideally, the neutral idle feature should be available in each gear ratio, which requires the neutral idle strategy to be independent of the states of the stages of the solenoids in the shift control valve system.

The control valve system of the invention is able to provide small, incremental clutch pressure adjustments to effect neutral idle, but it is capable also of responding to sudden throttle position changes.

BRIEF DESCRIPTION OF THE DRAWINGS

FIG. 5 is a detail view of the engagement control valve system for reverse engagements, which is included in the control system diagram of FIG. 3a.

FIG. 10 is a plot of the solenoid output pressures for the variable force solenoids for controlling forward engagements and for controlling modulate pressure versus variable force solenoid output pressure for forward engagements.

FIG. 10a is a detail view of a modulator valve spool used in the modulator valve for forward engagements.

FIG. 11 is a detail view of the pressure modulator valve for reverse.

PARTICULAR DESCRIPTION OF THE INVENTION

Figure 1:
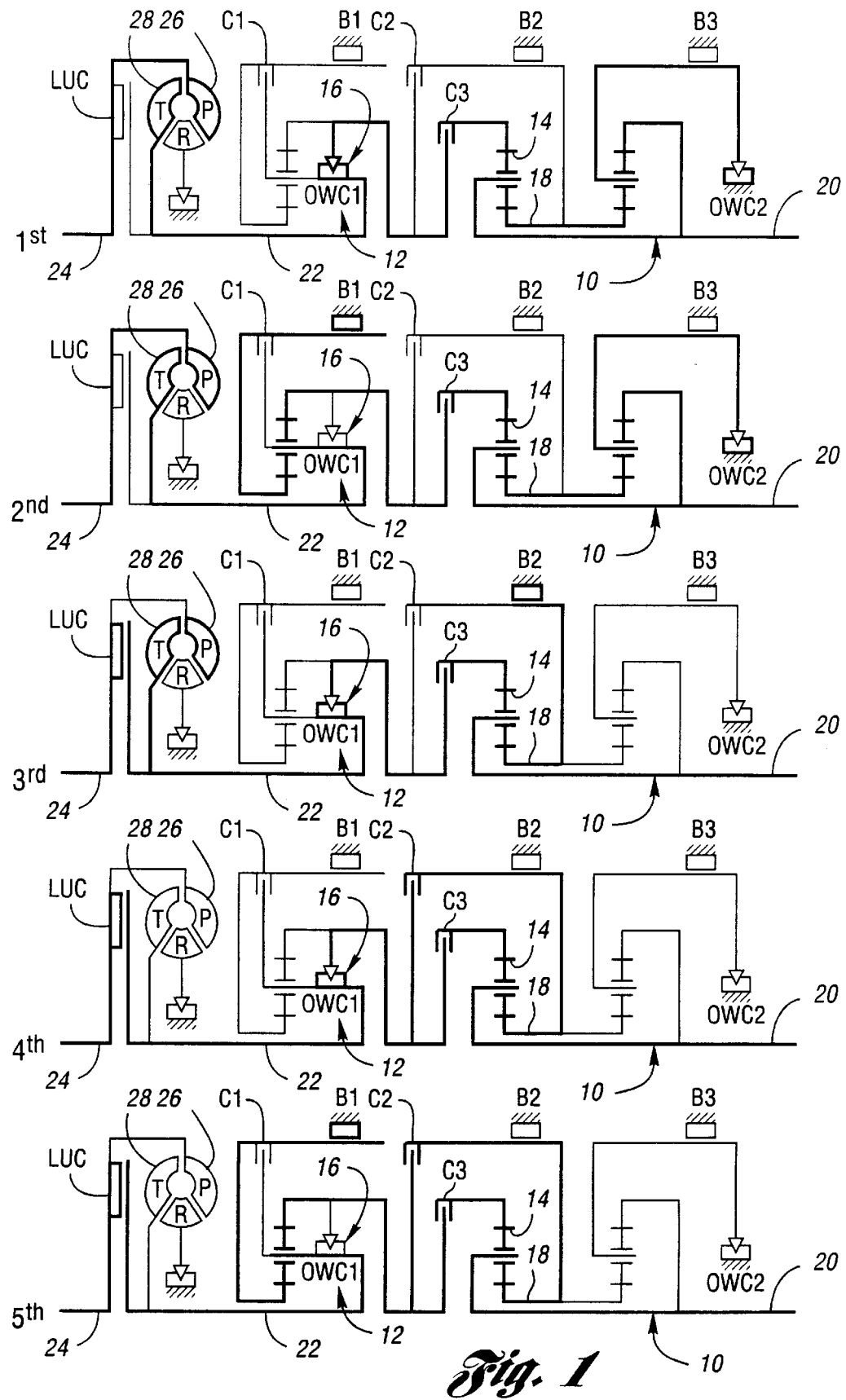
FIG. 1 is a schematic diagram of a non-synchronous transmission having a Simpson gear set and a simple planetary gear set arranged in series. The torque flow paths for each of five forward drive ratios are illustrated by heavy lines whereas the lighter lines designate transmission elements that are not subjected to torque in each of the five forward driving modes.

In FIG. 1, several operating modes for a first embodiment of a transmission gearing arrangement is illustrated schematically. The transmission includes a so-called Simpson gear set, shown generally at 10, and a simple planetary gear set, shown generally at 12. A torque input ring gear 14 for the Simpson gear set receives torque from a forward drive clutch C3, which is engaged during each of five forward driving ratios. Overrunning coupling 16 between the carrier and ring gear of gear set 12 is engaged during operation in the first, third and fourth ratios when sun gear brake B1 is released. The sun gear 18 for the Simpson gear set is adapted to be braked during third speed ratio operation by brake band B2.

Clutch C3 delivers torque to ring gear 14 through overrunning coupling 16 during operation in the first, third and fourth forward driving ratios. A carrier of the first gear unit of the Simpson gear set delivers torque to the torque output shaft 20. The torque on the sun gear 18 is multiplied by the second gear unit of the Simpson gear set as a second torque flow path is established extending to the torque output shaft 20.

Turbine shaft 22 acts as a torque input shaft for the gear unit 10. The engine crankshaft 24 is connected drivably to impeller 26 of the hydrokinetic torque converter. The turbine 28 of the hydrokinetic torque converter is connected to the turbine shaft 22.

During operation in the second ratio, brake band B1 anchors the sun gear of the simple planetary gear set 12. Turbine torque in shaft 22 then drives the ring gear of the simple planetary gear set 12 with an overdrive ratio as the sun gear of the simple planetary gear set acts as a reaction point. The output torque of the simple planetary gear set then is distributed through engaged clutch C3 to the Simpson planetary gear set.

Third speed ratio is achieved by engaging brake B2, which anchors the sun gear of the Simpson planetary gear set. The overrunning coupling of the simple planetary gear set then drives the input ring gear 14 of the Simpson gear set at turbine shaft speed. The second gear unit of the Simpson gear set does not deliver torque as it does in the case of operation in the first and second ratios, where overrunning coupling OWC2 anchors the carrier of the second gear unit of the Simpson gear set.

The fourth ratio is a direct drive ratio. It is achieved by engaging simultaneously clutch C2 and clutch C3. All of the brakes are released.

Fifth forward drive ratio operation is achieved by engaging brake B1, which anchors the sun gear of the simple planetary gear set. Overrunning coupling 16 freewheels.

The ratio change from the third ratio to the fourth ratio, from the fourth ratio to the third ratio, and from the fifth ratio to the third ratio involves a synchronous shift that is accomplished by engaging clutch C2 and releasing brake B2, or by releasing brake B1 and clutch C3 while applying brake B2 in the case of fifth ratio operation.

Reverse ratio is achieved by applying clutch C2 and anchoring the carrier of the second gear unit of the Simpson gear set by applying brake B3. Clutch C2 is applied, so turbine shaft torque is distributed through gear set 12 to the sun gear 18. With the rear carrier anchored, the output shaft 20 and the ring gear for the second gear unit of the Simpson gear set are driven in a reverse direction.

Figure 2:
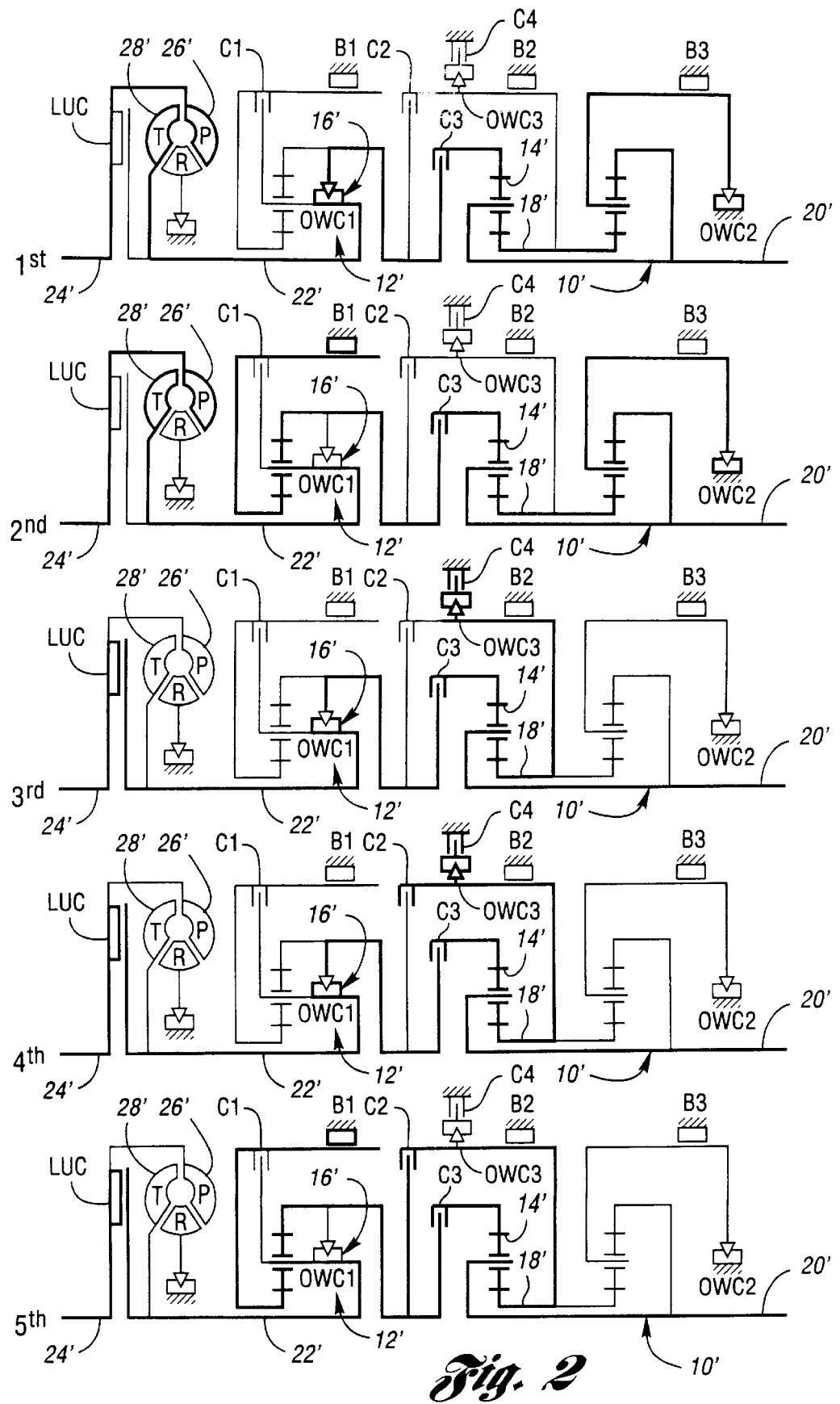
FIG. 2 is a schematic illustration of a five-speed ratio transmission corresponding to the transmission of FIG. 1 wherein the reaction element of the Simpson gear set is an overrunning coupling, which establishes a reaction point for the Simpson gear set during third speed ratio operation and which overruns in fourth and fifth speed ratio operation.

FIG. 2 shows schematically a transmission similar to the transmission illustrated in FIG. 1 except that the 4–3/3–4 and 5–3 shifts are non-synchronous. That is, the sun gear of the Simpson planetary gear set is anchored by an overrunning coupling shown at C4. The outer race of the overrunning coupling is braked against the transmission case by a pressure-operated friction coupling C4. The elements of the transmission illustrated in FIG. 2 that have corresponding elements in the transmission of FIG. 1 have been designated by similar reference numerals, although prime notations are added to the elements of FIG. 2.

Figure 3A:
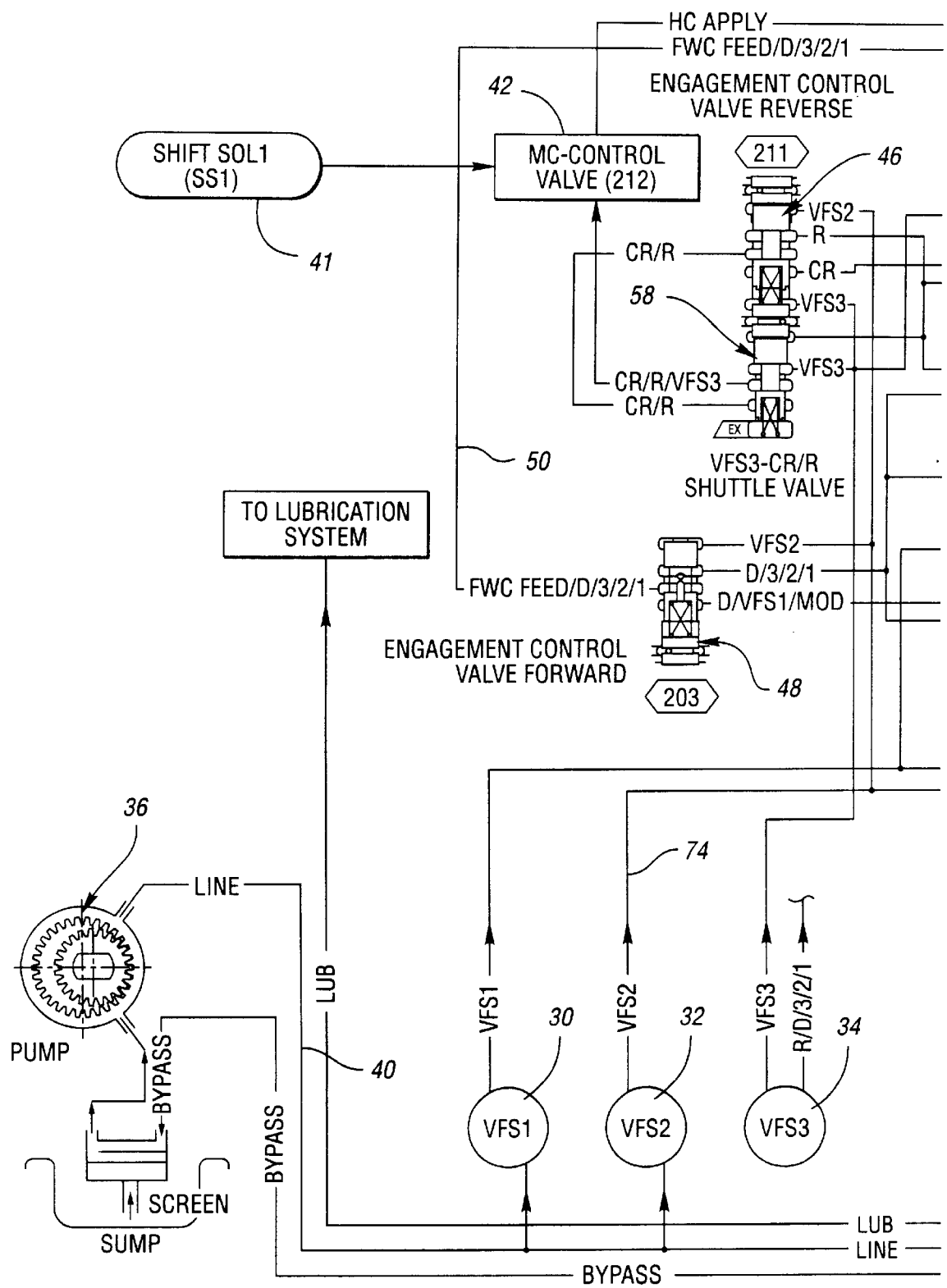
FIGS. 3a and 3b, taken together, show a reverse and forward engagement control valve system embodying features of the invention.
Figure 3B:
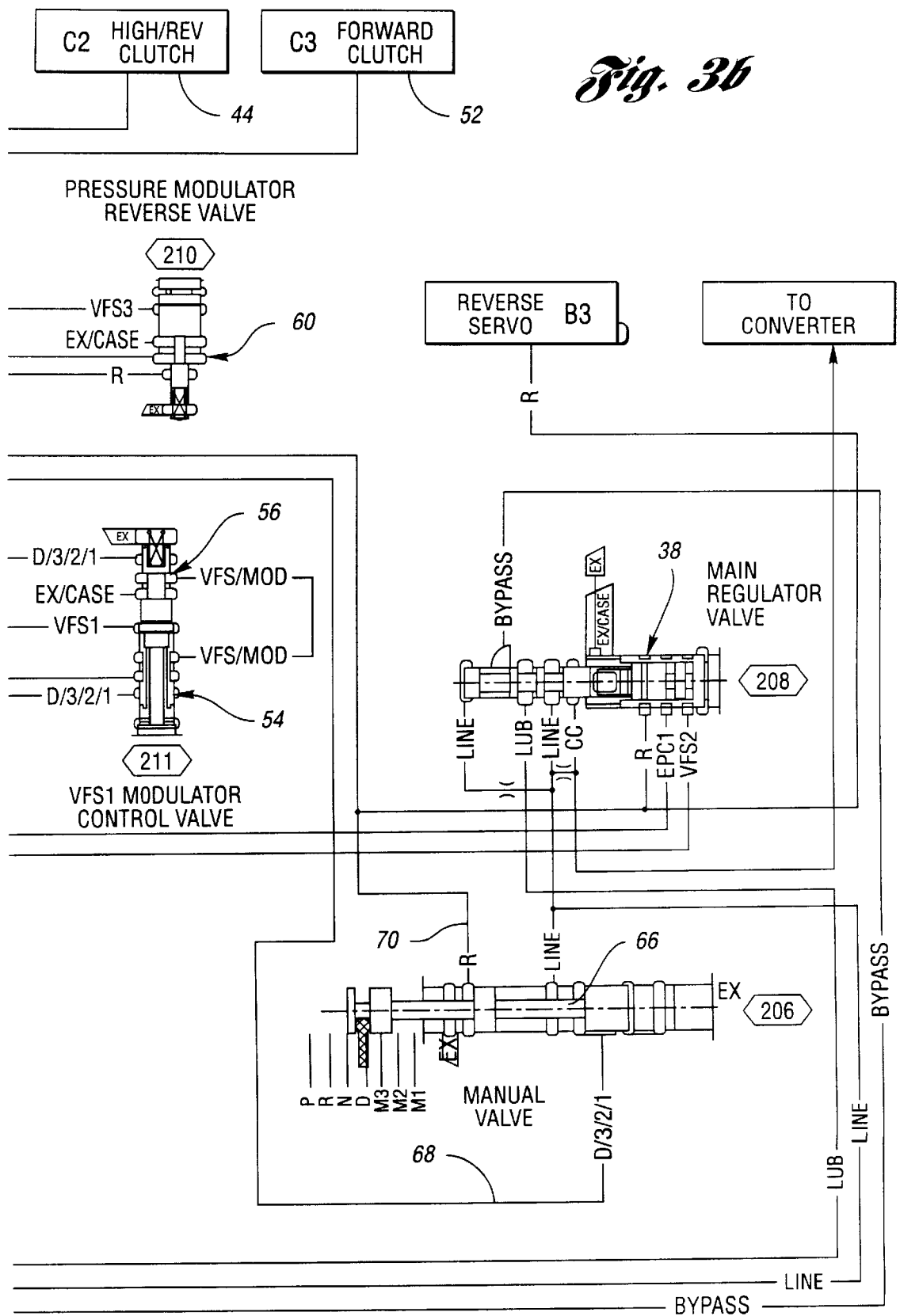

The overall reverse and forward engagement control valve system is shown in FIGS. 3a and 3b. This control system includes three variable force solenoid valves shown at 30, 32 and 34 in FIG. 3a. The so-called multiplexing functions of these variable force solenoid valves for static reverse engagement and for static forward engagement now will be described.

A line pressure pump 36 supplies fluid pressure to main regulator valve 38 through line pressure passage 40. The main regulator valve is shown in FIG. 3b and the pump is shown in FIG. 3a. Reverse drive for the transmission shown in FIG. 1, as well as in the transmission shown in FIG. 2, is achieved by applying brake B3 which anchors the carrier of the second gear unit of the Simpson gear set. Clutch C3 is released and clutch C2 is applied, as mentioned previously. Thus, turbine torque is delivered through clutch C2 directly to the sun gear 18 of the Simpson gear set. With the carrier being anchored by the brake band B3, the ring gear of the second gear unit of the Simpson gear set and the output shaft 20 are driven in a reverse direction.

During reverse engagements, the clutch C2 is controlled rather than the brake B3, because the brake B3 has a higher capacity gain compared to the capacity gain of the clutch C2. In contrast, during forward engagements, the forward clutch C3 is controlled.

During reverse engagements, the rear brake band B3 is applied with line pressure first. That engagement is followed by engagement of the high clutch C2. The high clutch capacity then is controlled independently following rear brake engagement.

FIG. 3a shows a single on/off solenoid at 41, which is part of the shift solenoid valve system. A high clutch control valve 42 communicates with the high clutch apply pressure chamber for the clutch C2, as shown at 44 in FIG. 3b.

The engagement control valve for reverse is shown at 46 in FIG. 3a. It establishes an input pressure for the high clutch control valve 42. An engagement control valve for forward is shown at 48. It provides a feed pressure in passage 50 for the forward clutch C3, as shown at 52. The input pressures for the engagement control valve for forward, seen at 48, is supplied by a variable force solenoid modulator control valve 54 and a variable force solenoid modulator valve 56.

The circuit of FIGS. 3a and 3b includes also a variable force solenoid CR/R shuttle valve at 58, which distributes either variable force solenoid pressure from solenoid valve 34 to the high clutch apply circuit or modulated CR pressure from pressure modulator reverse valve 60 (or reverse line pressure) to the high clutch apply circuit.

The variable force solenoid valves and the on/off solenoids of the shift valve system are controlled by a microprocessor with sensor input portions that receive engine and transmission operating variables and a memory portion that stores control strategy and control algorithms.

Figure 9:
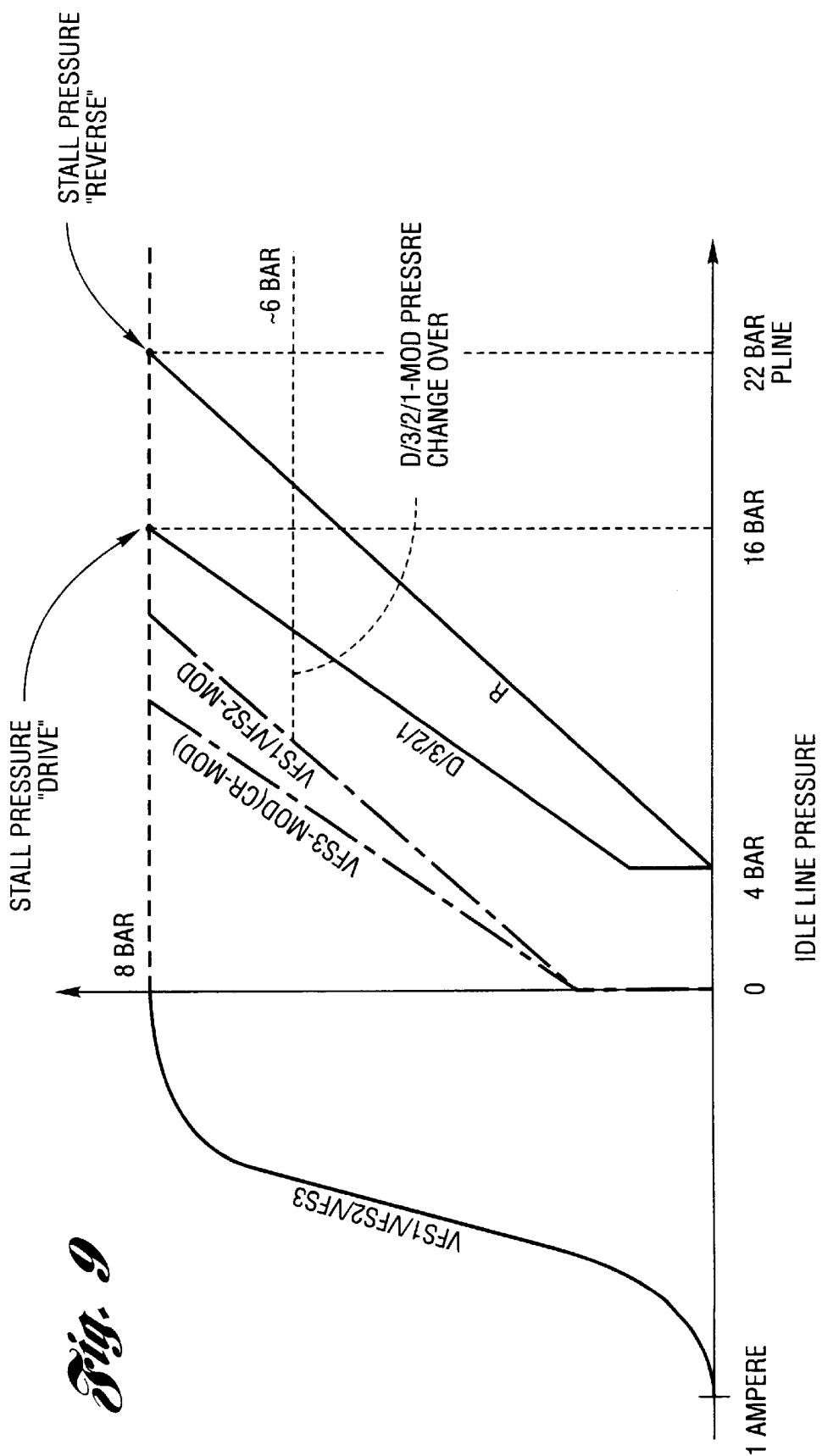
FIG. 9 is a plot of the pressure build-up characteristics for the transmissions of FIGS. 1 and 2.

The three variable force solenoids 30, 32 and 34 are proportional control devices that convert current with an average of 0 to 1 amp into a pressure of 8 to 0 bar. The transfer function for this conversion, which is stored in the ROM memory of the electronic processor, is shown in FIG. 9, where line pressure and modulator pressure are plotted against the output of the variable force solenoids VFS1, VFS2 or VFS3. The maximum pressure output of these valves is 8 bar, as shown in FIG. 9, as the amperage at the solenoids of the solenoid valves is varied. The output pressure for the variable force solenoid 34 and the output pressure for variable force solenoid 32 (VFS2/MOD), which will be described with reference to FIG. 10, also are illustrated in FIG. 9 as variables plotted against the output pressures of the variable force solenoids.

The transfer function shown in FIG. 9 is an electronic-hydraulic transfer function used to adjust the capacity of the clutches involved in either a forward engagement or a reverse engagement.

The solenoids 30 and 32 communicate with a main regulator valve assembly 38. The main regulator valve assembly output pressure is amplified as the variable force solenoid pressures are applied to the boost valve portion of the main regulator valve assembly 38. The feed pressure for each of the variable force solenoid valves 30 and 32 is line pressure.

The variable force solenoid 30 communicates with the variable force solenoid modulator control valve 56 and the variable force solenoid modulator valve 54. The pressure developed by the variable force solenoid 30 is a pressure called VFS1/MOD in FIG. 3b, which is useful in developing a smooth engagement of the forward clutch 52.

Variable force solenoid 34 is connected to the reverse pressure modulator valve 60. This is required in order to provide adequate control for the high clutch during a reverse engagement. In this instance, the characteristic of the clutch pressure modulator valve for reverse drive produces a smooth reverse engagement just as the valve 56 provides smooth forward clutch engagement.

Variable force solenoid pressure VFS3 is used also, together with pressure VFS2, to control the pressure thresholds where CR pressure satisfies capacity for smooth engagement control and R pressure satisfies the stall capacity. The pressure VFS2 is used to vary the engagement control range for the reverse and forward engagements, depending upon the operating range of the vehicle. This is referred to as the pressure threshold where the engagement pressure is multiplexed with stall pressure for forward engagements or reverse engagements. These functions for each of the variable force solenoids are illustrated in the following chart:

FIG. 1 and FIG. 2 Engagement Control System

| | Reverse Engagement | | Forward Engagement |
|---|---|---|---|
| | B3 | C3 | C3 |
| VFS1 | Line pressure control to hold B3/C3 capacity | | 1) Engagement control of forward clutch AND 2) LINE pressure control to hold C3 capacity |
| VFS2 | Line pressure control to hold B3/C3 capacity | Multiplexing between CR and R pressure applied on C2 | 1) Multiplexing between VFS1/MOD pressure and LINE pressure applied on C3 AND 2) LINE pressure control to hold C3 capacity |
| VFS3 | | 1) Engagement control of C2 AND 2) Multiplexing between CR and R pressure applied on C2 | |

Shaded area = Control Action

Figure 6A:
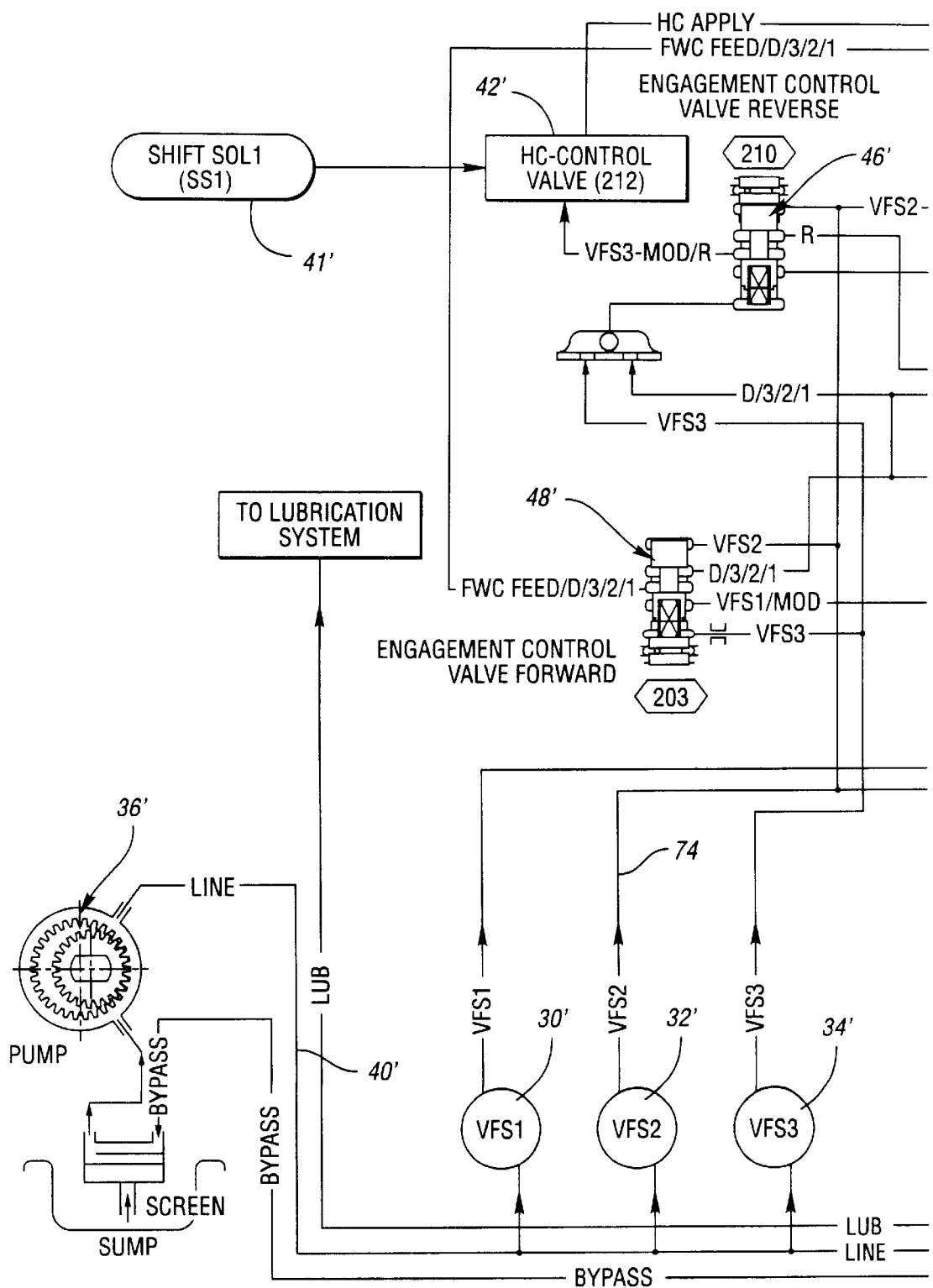
FIGS. 6a and 6b together show the reverse and forward engagement control valve system for a modified form of the transmission illustrated schematically in FIG. 1.
Figure 6B:
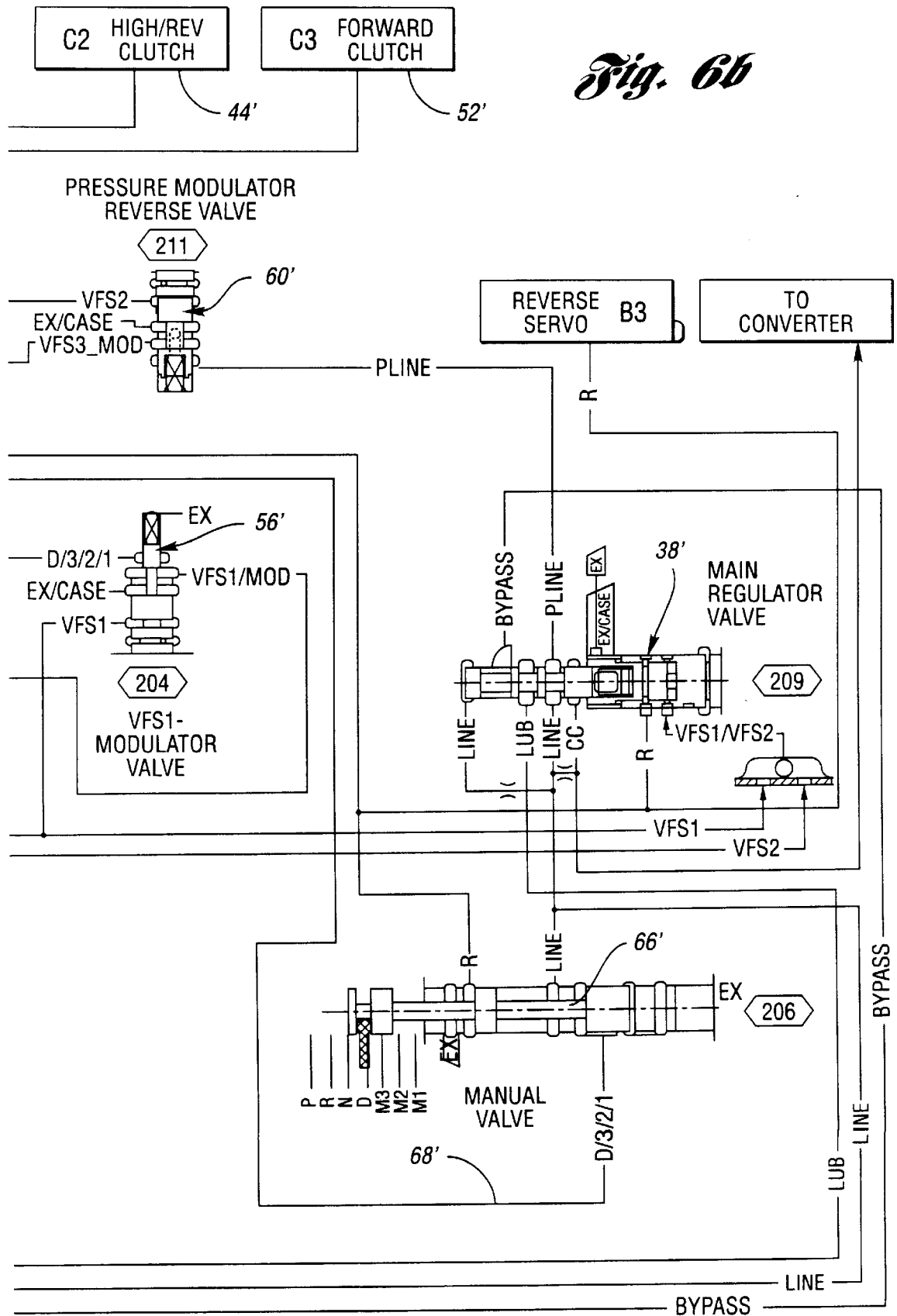

FIGS. 6a and 6b show a modified control valve system for forward engagement and for reverse engagement. It is applicable only to the transmission illustrated schematically in FIG. 1. The control valve system of FIGS. 6a and 6b has elements that are common to the control valve system of FIGS. 3a and 3b. Corresponding numerals are used to designate the various elements of the control valve system of FIGS. 6a and 6b, although prime notations are added.

Unlike the control valve system of FIGS. 3a and 3b, there is no VFS1/MOD control valve in the control system of FIGS. 6a and 6b. Neither is there a VFS-CR/R shuttle valve, which is used in the control valve system of FIGS. 3a and 3b.

The multiplexing functions of variable force solenoids VFS1 and VFS3 shown at 30' and 34' in FIG. 6a for forward and reverse engagements are the same as the corresponding valves for the control valve system of FIGS. 3a and 3b except that the forward engagement control system of the circuit of FIGS. 6a and 6b contains the additional capability of a "neutral idle" function. This is accomplished by the deletion of the cross port shown at 64 in FIG. 4, which extends between the lower side of the valve spool occupied by the valve spring and the forward clutch feed passage, and by connecting VFS3 pressure from solenoid valve 34' to the lower end of the engagement control valve for forward drive as shown at 48' in FIG. 6a. This feature is shown in greater detail in the enlarged view of the engagement control valve for forward drive seen in FIG. 8. This allows multiplexing of the VFS1/MOD pressure and the line pressure for the forward clutch under all operating modes depending upon the amount of pressure applied by VFS2 and VFS3.

A summary of the multiplexing functions of each variable force solenoid for forward engagement and for reverse engagement is shown in the following table.

FIG. 2 and FIGS. 6a/6b Transmission Supplement Engagement Control System

| | Reverse Engagement | | Forward Engagement |
|---|---|---|---|
| | B3 | C2 | C3 |
| VFS1 | Same as in above chart | | Same as in above chart |
| VFS2 | Same as in above chart | Same as in above chart | Same as in above chart |
| VFS3 | | 1) Engagement control of C2 AND 2) Multiplexing between VFS3/MOD and R pressure applied to C2 | |

As previously mentioned, a forward engagement control system is shown in FIGS. 3a and 3b. The forward engagement control system consists of the VFS1/MOD valve shown at 56 in FIG. 3b and the forward engagement control valve shown at 48 in FIG. 3a. The forward engagement control valve is shown in enlarged form in FIG. 4.

When the driver moves the manual lever to adjust the manual valve 66, from the neutral position or the reverse position to the drive position, or to the M3, M2 or M1 positions, a forward engagement is initiated. At this point, line pressure is distributed by the manual valve 66 through the passage 68. This acts as an input pressure for the VFS1/MOD valve 56. The characteristic of the VFS1/MOD valve is shown in FIG. 10. The VFS1/MOD valve 56 is controlled by the VFS1 pressure signal developed by the variable force solenoid 30. The VFS1 pressure signal is in equilibrium with the VFS1/MOD pressure and the spring force derived from the line pressure input in line 68.

The characteristic of the VFS1/MOD valve allows a pressure capacity control of the forward clutch 52 from zero pressure capacity to any desired pressure capacity. Any pressure characteristic during the shift interval is possible in accordance with the control strategy that is stored in the memory portion of an electronic microprocessor that controls the variable force solenoids and the on/off shift solenoids. This makes it possible to achieve smooth application of the forward clutch, which results in smooth forward engagements. The VFS1/MOD pressure is then distributed over the VFS1 modulator control valve 56 to the forward engagement control valve 48. The input pressures for the forward engagement control valve are line pressure (D/3/2/1) and VFS1/MOD pressure.

Figure 4:
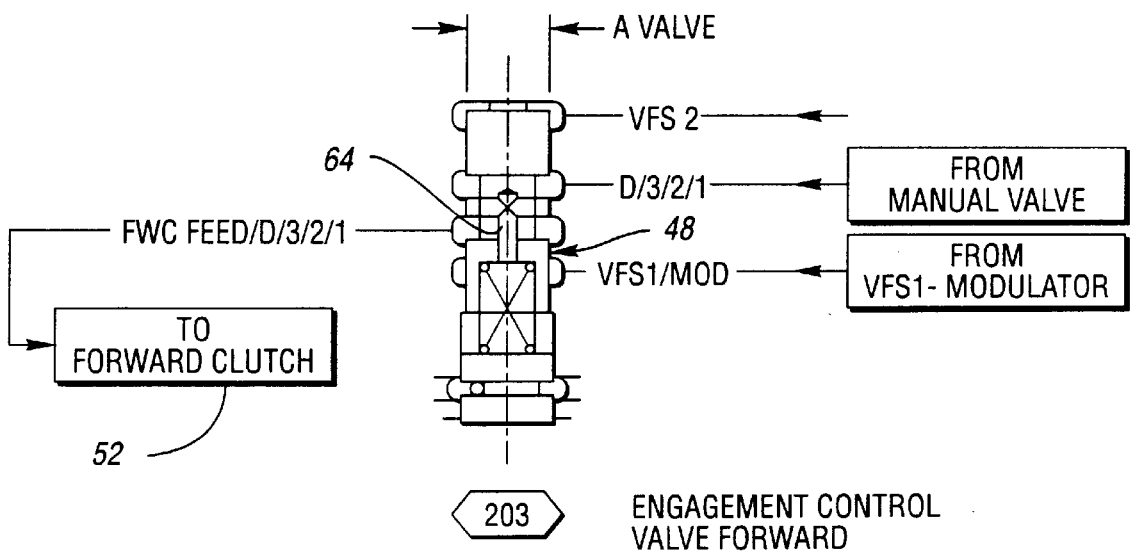
FIG. 4 is a detail view of an engagement control valve for forward drive.

The engagement control valve 48 has two ports that connect either of the two applied pressures to the back side of the valve occupied by the valve spring. The top of the valve, seen at FIG. 4, is subjected to VFS2 pressure. When the driver moves the manual lever from a neutral position or a reverse position to one of the drive positions, the VFS2 pressure is set high. This moves the engagement control valve into an upshift position. This then connects the VFS1/MOD pressure to the forward clutch, thereby effecting a forward engagement. When the forward engagement is completed, the forward clutch pressure is ramped to line pressure (D/3/2/1 pressure) by increasing the VFS1/MOD pressure, which acts together with a spring load on the back side of the engagement control valve against the force of VFS2 pressure. This so-called clip point is set according to the formula:

$$VFS2 \le VFS1/\text{MOD} + \frac{FS}{A valve}$$

If the VFS2 pressure threshold is exceeded by a VFS1/MOD pressure, the forward engagement control valve moves into its downshift position since, at the changeover point for the valve, the higher line pressure (D/3/2/1 pressure) is applied on the back side of the engagement control valve. Since VFS1 and VFS2 are input pressures for the main regulator valve, both of these variable force solenoids then amplify the line pressure, which in this case is D/3/2/1 pressure. This means that once the forward engagement control valve is clipped to the D/3/2/1 pressure, the forward clutch stays at the line pressure (D/3/2/1 pressure) unless the driver moves the manual lever to the neutral position, thereby exhausting the D/3/2/1 circuit.

Figure 4A:
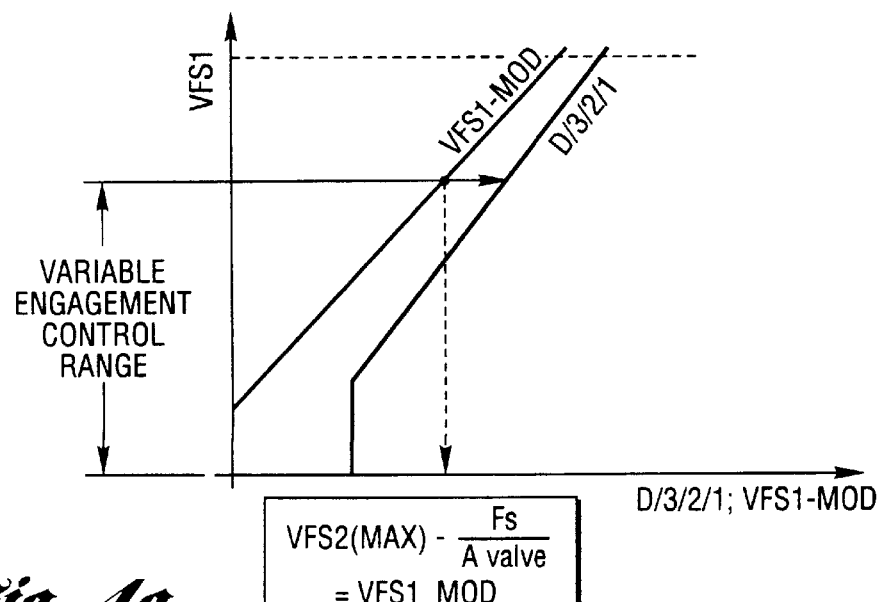
FIG. 4a is a graph showing the relationship between the variable force solenoid output pressure and modulated variable force solenoid pressure for forward engagement.

With the VFS2 pressure applied on the head of the engagement control valve 48, a variable clip point is achieved. This allows a variable engagement control range, as seen in FIG. 4a, where the forward clutch is still controlled by the VFS1/MOD pressure instead of the line pressure (D/3/2/1/ pressure). This variable engagement control range allows an optimized matching between the input torque and input speeds and the clutch capacity or VFS1/MOD pressure, thereby accomplishing smooth forward engagements. The variable engagement control range is calculated as follows:

Variable Control Range=VFS2 Control Range–FS/Avalve, where FS is spring force and Avalve is valve land area.

The reverse and forward engagement control valve system of FIGS. 6a and 6b now will be described together with the neutral idle function. The forward engagement control valve system consists of the VFS1/MOD valve 56' and the forward engagement control valve 48'. The forward engagement control valve 48' is shown in detail in FIG. 8.

When the driver moves the manual lever to adjust the manual valve 66' to the drive position or to the M3, M2 or M1 positions, a forward engagement is initiated. At this point, line pressure is distributed by the manual valve 66'. This is an input pressure to the VFS1/MOD valve 56'. The characteristic for this modulator valve is shown in FIG. 10.

The VFS1/MOD valve 56' is controlled by the VFS1 pressure signal developed by variable force solenoid 30'. The VFS1 pressure signal is in equilibrium with the spring force and VFS1/MOD pressure that is developed from the line pressure input (D/3/2/1 pressure). The characteristic of the VFS1/MOD valve allows a pressure capacity control for the forward clutch from 0 pressure capacity to a desired level of pressure capacity. Any pressure characteristic during this shift interval is possible depending on the control strategy that is stored in the memory portion of the microprocessor. This allows smooth application of the forward clutch, thereby resulting in smooth forward engagements. The VFS1/MOD pressure and the line pressure D/3/2/1 communicate with the forward engagement control valve 48'.

Figure 8:
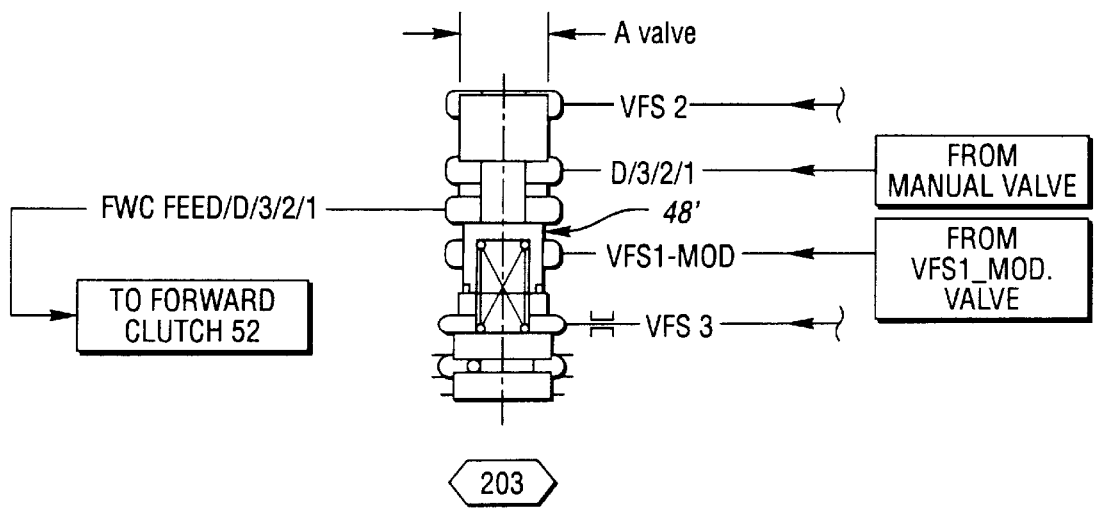
FIG. 8 is a detail view of the engagement control valve for forward drive for the modified control system of FIGS. 6a and 6b.

The forward engagement control valve is shown in detail in FIG. 8. The input pressures to the forward engagement control valve 48' are the line pressure (D/3/2/1 pressure) and the VFS1/MOD pressure. The head of the valve communicates with VFS2 pressure and the back side of the valve communicates with VFS3 pressure. When the driver moves the manual lever from the neutral or reverse position to one of the drive positions, the VFS2 pressure is set to a high level, which moves the engagement control valve into the upshift position. This connects the VFS1/MOD pressure to the forward clutch, thereby executing a forward engagement. When the forward engagement is completed, the forward clutch is connected to line pressure (D/3/2/1 pressure) by increasing VFS3 pressure developed by solenoid valve 34', which acts together with the spring load on the back side of the engagement control valve against the force of the VFS2 pressure. The changeover point from VFS1/MOD pressure to line pressure (D/3/2/1 pressure) is set in accordance with the following equation:

$$VFS2 \le VFS3 + \frac{FS}{A valve}$$

where FS is spring force and Avalve is the valve land area.

Figure 8A:
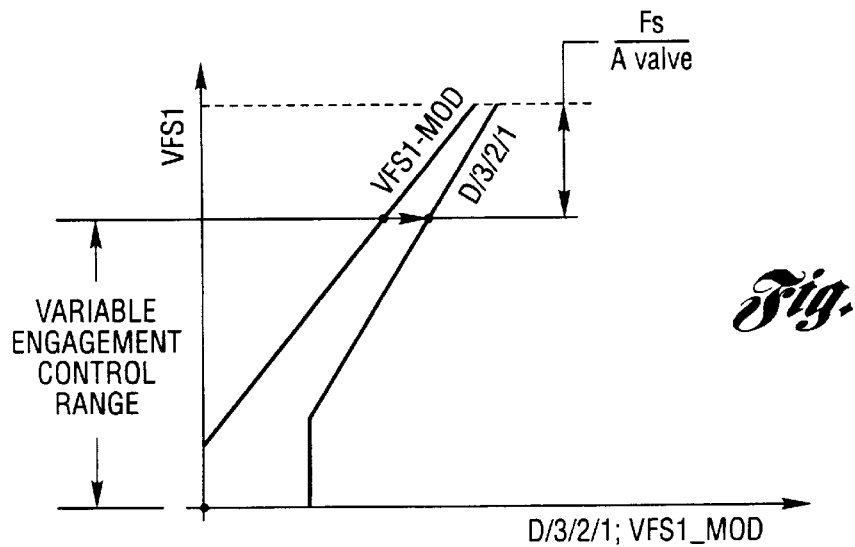
FIG. 8a is a plot of the variable force solenoid output pressure for forward engagements versus modulated variable force solenoid for forward engagements.

If the VFS3 pressure threshold is exceeded by the VFS3 pressure and the spring load, the forward engagement control valve moves into the downshift position. Since VFS1 pressure and VFS2 pressure are input pressures for the main regulator valve 38', both variable force solenoids 30' and 32' amplify the line pressure. This generates enough input pressure for the variable force solenoid 34' and the pressure modulator valve for forward shown at 56.' With the VFS2 pressure applied on the head of the engagement control valve for forward shown at 48' and with VFS3 pressure applied on the back side of the forward engagement control valve 48', a variable threshold point is achieved. This allows a variable engagement control range where the forward clutch is controlled by VFS1/MOD pressure instead of line pressure. This is shown in FIG. 8a. This variable engagement control range allows for optimized matching of the input torque and speed with clutch capacity or VFS1/MOD pressure, thereby accomplishing smooth forward engagements. The variable engagement control range is calculated as follows:

Variable Control Range VFS2 Control Range–FS/Avalve

A neutral idle function is made possible by multiplexing D/3/2/1 pressure or VFS1/MOD pressure, which is controlled by variable force solenoids 32' and 34', as previously explained. Variable force solenoid 30' produces a pressure called VFS1/MOD in conjunction with the VFS1/MOD pressure modulator valve 56'. Variable force solenoid 30' determines the pressure level that the VFS1/MOD pressure schedule uses in the control of forward clutch capacity. Variable force solenoids 30' and 32' are automatically capable of supplying pressure to provide enough input pressure for the variable force solenoid 34'. Variable force solenoid 34' can now be set to a low level in the application of VFS1/MOD pressure to the forward clutch. This allows engagement of the forward clutch at any desired operating mode of the vehicle with marginal torque transmitting capacity, where the forward clutch is engaged with only slight frictional contact between the friction surfaces of the clutch. This is achieved by applying VFS1/MOD pressure so that the forward clutch pressure can be ramped down in accordance with the pressure characteristic shown in FIG. 10. This increases the fuel economy of the vehicle driveline since the engine will be unloaded when the vehicle is at a standstill with the first gear ratio engaged. This same neutral idle function can be used, however, during any "power off" or zero throttle operating condition when the vehicle is moving.

Figure 5:
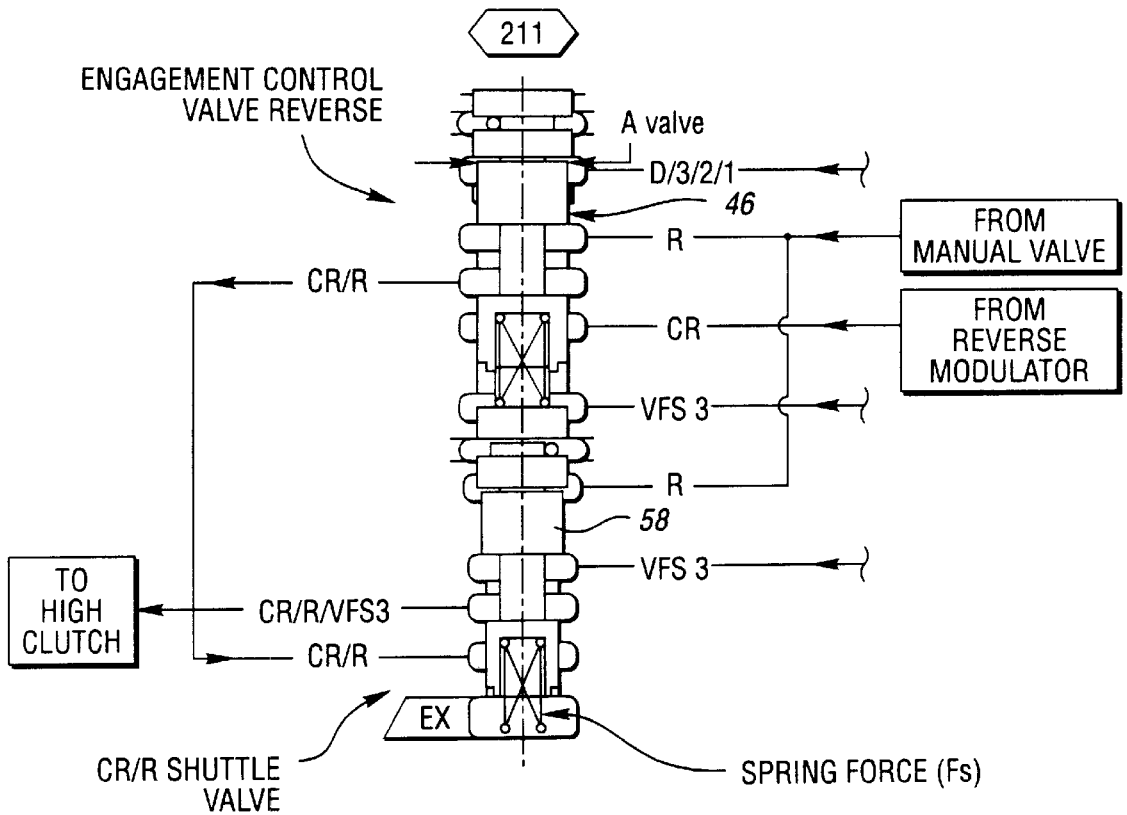

Reference now will be made again to FIGS. 3a and 3b for the purpose of describing reverse engagement control rather than forward engagement control. The reverse engagement control system consists of the reverse modulator valve 60, the reverse engagement control valve 46, and the VFS3-CR/R shuttle valve 58 shown in FIG. 3a. Valve 60 is shown in FIG. 3b. An enlarged detail view of the engagement control valve for reverse is seen in FIG. 5, as well as the shuttle valve 58.

Reverse engagement is initiated when the driver moves the manual valve 66 to the reverse position. At this point, line pressure is distributed by the manual valve 66 through passage 70. This is identified in FIGS. 3a and 3b as reverse line pressure R. This is an input pressure for the reverse pressure modulator valve 60.

The valve 60 is controlled by a VFS3 pressure signal from the variable force solenoid 34. That pressure signal is in equilibrium with a spring load and a pressure called CR pressure in FIGS. 3a and 3b, which is derived from R input pressure.

The characteristic of the reverse pressure modulator valve establishes capacity control of the high clutch 44, which ranges from zero pressure capacity to any desired level of pressure capacity. Any pressure characteristic during a shift interval is possible depending upon the control strategy that is stored in the memory of the microprocessor. Thus, smooth application of the high clutch C2 will result in smooth reverse engagements.

During reverse engagement, the rear brake band B3, shown in FIGS. 1 and 2, and the high clutch C2 44 must be engaged, as previously explained. In order to ensure smooth and consistent reverse engagement, both of these elements must be engaged in sequence. The best arrangement would require application of the rear brake band B3 first. That would be followed by the engagement control of the high clutch 44 (C2). This sequential engagement of the clutch CL2 and brake B3 now will be described.

The total resistance of the reverse servo during the stroke phase, which includes the spring force and frictional resistance, must be lower than the total resistance of the high clutch in the disengaged mode, which also includes the spring load and frictional resistance of the high clutch.

Further, reverse line pressure R, which is the pressure applied to the reverse servo, is the input pressure to the pressure modulator valve for reverse shown at 60. Modulated CR pressure cannot be higher than the high clutch stroke pressure since the total resistance of the high clutch is higher than the total resistance of the reverse servo, as previously explained.

CR pressure is distributed to the reverse engagement control valve 46. The input pressures to the reverse engagement control valve are line pressure for reverse R and CR pressure. The head of the valve communicates with VFS2 pressure through passage 74, seen in FIG. 3a, and the back side of the valve is subjected to VFS3 pressure from solenoid valve 34. When the driver moves the manual lever from the neutral position or from the drive position, M1 position, M2 position, or the M3 position to the reverse position, VFS2 pressure in passage 74 is set at a high level which moves the engagement control valve 46 to the upshift position. Since VFS1 pressure and VFS2 pressure are control pressures for the main regulator valve system that amplify the line pressure maintained by regulator valve 38, as explained previously, a high enough input pressure thus is provided for the reverse pressure modulator valve 60 and for the variable force solenoid 34.

When the reverse engagement control valve 46 is upshifted, it connects CR pressure to the CR/R-VFS3 shuttle valve 58. Shuttle valve 58 is controlled by R pressure and the multiplexes CR/R pressure with VFS3 pressure depending on the manual level position. The shuttle valve is in the upshift position since R pressure is applied on the head of the valve and overcomes the spring load acting on the bottom of the valve. CR pressure from the reverse pressure modulator valve then is applied to the high clutch, thereby executing reverse engagement. When the reverse engagement is completed, the high clutch is applied with R pressure by increasing VFS3 pressure, which acts together with the spring load on the back side of the reverse engagement control valve 46 against the force of VFS2 pressure. The changeover point between CR pressure and R pressure is set according to the following equation:

$$VFS2 \leq VFS3 + \frac{FS}{Avalve}$$

Figure 5A:
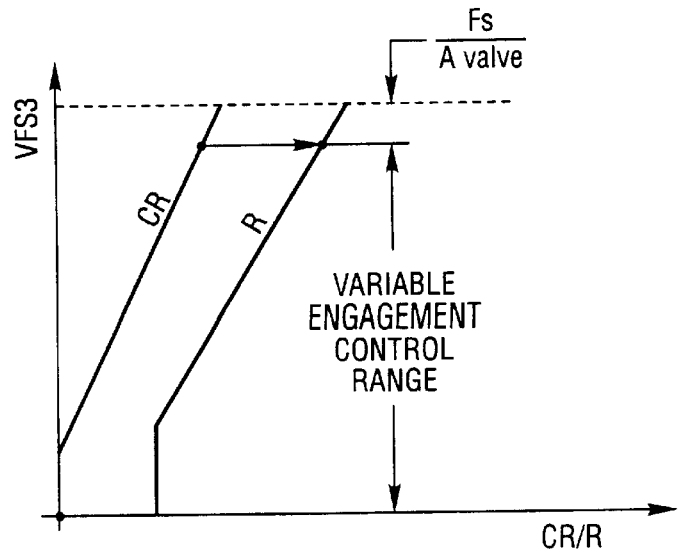
FIG. 5a is a plot of the variable force solenoid pressure for reverse engagements versus reverse modulator pressure and reverse line pressure made available for reverse engagements.

If the VFS2 pressure threshold is exceeded by the VFS3 pressure setting, the reverse engagement control valve moves into the downshift position. With the VFS2 pressure applied on the head of the reverse engagement control valve 46, a variable threshold between CR pressure and R pressure is applied on the high clutch 44 (C2). This allows a variable engagement control range where the high clutch is controlled by CR pressure instead of R pressure. This is shown in the graph of FIG. 5a. This variable engagement control range allows an optimized matching of input torque and speeds with clutch capacity, thereby accomplishing smooth reverse engagements. A variable engagement control range is calculated as follows:

Variable Control Range=VFS2 Control Range−FS/Avalve

The reverse engagement function for the embodiment of the control system shown in FIGS. 6a and 6b now will be described. The forward engagement function for this control system was previously described.

The reverse engagement control system of FIGS. 6a and 6b comprises the pressure modulator valve for reverse, shown at 60', and the reverse engagement control valve shown at 46'. The reverse engagement control valve is shown in detail in FIG. 7.

Figure 12:
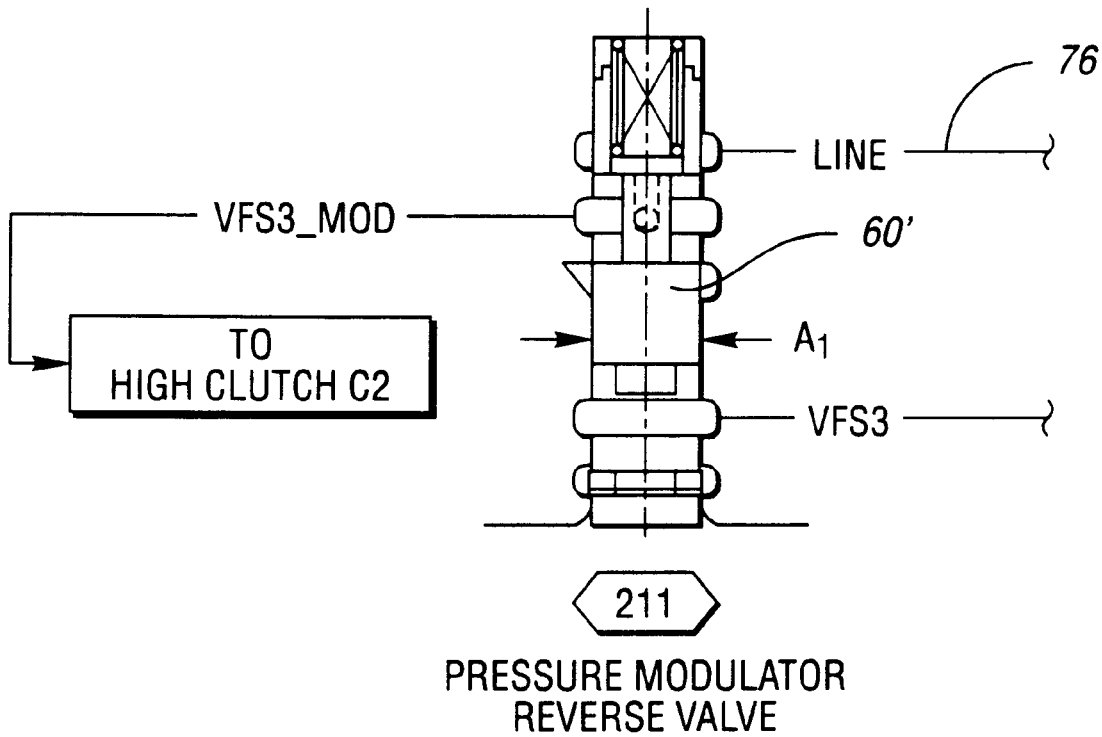
FIG. 12 shows an optional construction for the pressure modulator valve for reverse shown in FIG. 11.

When the driver moves the manual lever from the neutral position or the drive position, the M3 position, the M2 position or the M1 position to the reverse position, reverse engagement is initiated. At this point, line pressure is connected as an input pressure to the reverse pressure modulator valve 60'. This valve is shown in detail in FIG. 12. The reverse pressure modulator valve is controlled by VFS3-MOD pressure. That pressure signal is in equilibrium with line pressure and the spring load, where line pressure is an input pressure as illustrated in FIG. 12 at 76.

The characteristic of the reverse pressure modulator valve 60' allows pressure capacity control of the high clutch ranging from zero pressure capacity to any desired level of pressure capacity with the VFS3 pressure level as a maximum. Any pressure characteristic during the shift interval is controlled by the control strategy in the microprocessor memory. This allows smooth application of the high clutch C2, which results in smooth reverse engagements.

During reverse engagement, the rear brake band B3 and the high clutch C2 must be engaged, as previously explained with respect to FIG. 11. The engagements must occur in sequence. That is, the rear brake band B3 must be applied first. That is followed by the engagement of the clutch C2. As also explained previously, the total resistance of the reverse servo during the stroke phase, which includes the spring force and the frictional resistance, must be lower than the total resistance of the high clutch in the disengaged mode, which also includes a spring load and frictional resistance.

Figure 7:
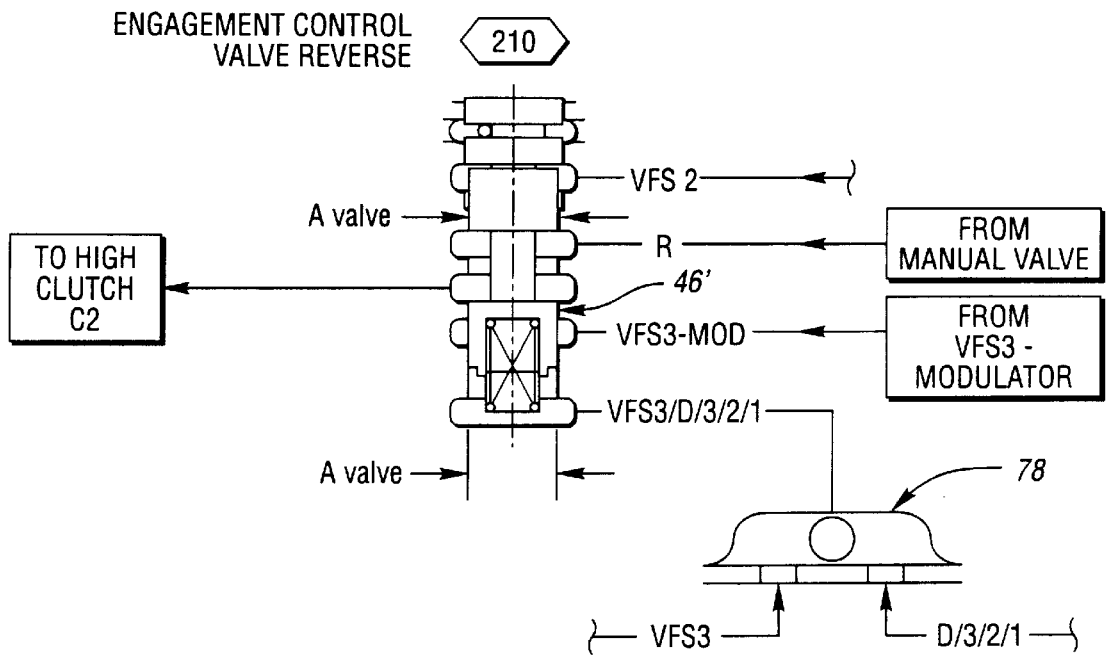
FIG. 7 is a detail view of the engagement control valve for the modified control system of FIG. 6b.

The VFS3-MOD pressure is directed to the reverse engagement control valve 46', as seen in FIG. 7. The input pressures for the reverse engagement control valve are R pressure and VFS3-MOD pressure. The head of the valve communicates with VFS2 pressure and the back side of the valve is connected to VFS3/D/3/2/1 pressure. A ball check valve arrangement shown at 78 in FIG. 7 accomplishes this dual pressure distribution to the lower end of the valve 46'.

Line pressure or D/3/2/1 pressure is available during operation in all the forward gear ratios. It keeps the reverse engagement control system in the downshift state regardless of the state of variable force solenoid 32'. This is required in order to ensure that the reverse line pressure R, as seen in FIG. 7, will function as an exhaust flow path for the direct clutch during upshifts and downshifts.

When the driver has moved the manual lever to the reverse position, the VFS2 pressure is set at a high level, which moves the engagement control valve to the upshift position. Since VFS1 and VFS2 pressures are control pressures for the main regulator valve system, the line pressure provided by the regulator valve 38' is amplified. A sufficiently high input pressure then is provided to the reverse pressure modulator valve 60' and to the variable force solenoid 34'. VFS3-MOD pressure then is applied to the high clutch C2 as reverse engagement is executed.

Upon completion of the reverse engagement, the high clutch C2 is applied with full R pressure by increasing the output of the variable force solenoid 34'. That increased VFS3 pressure acts with a spring load on the back side of the reverse engagement control valve against VFS2 pressure. The changeover point between VFS3/MOD pressure and R pressure is set according to the following equation:

$$VFS2 \leq VFS3 + \frac{FS}{Avalve}$$

Figure 7A:
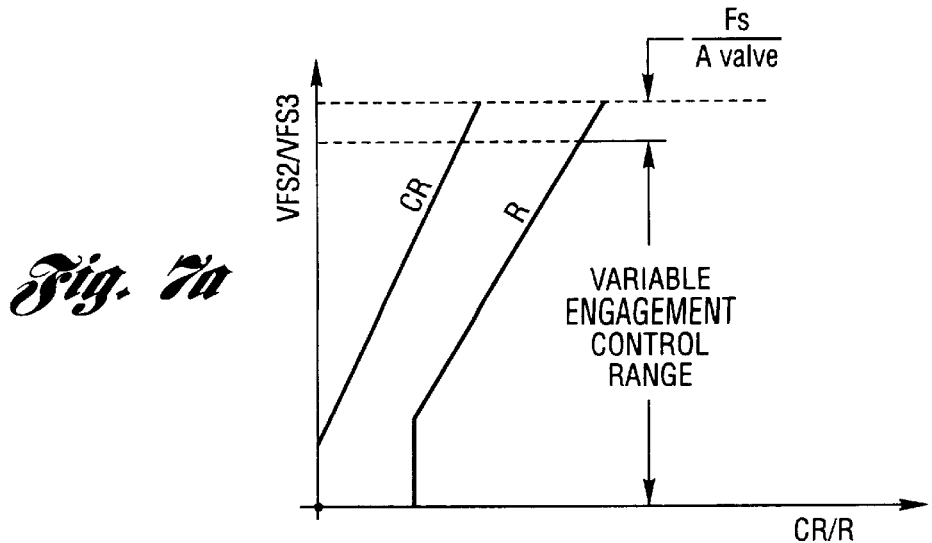
FIG. 7a is a plot of the variable force solenoid pressures for reverse engagement versus the modulated pressure for reverse.

If the VFS2 pressure threshold is exceeded by the VFS3 pressure setting, the reverse engagement control valve moves to the downshift position. With the VFS2 pressure applied on the head of the reverse engagement control valve, a variable threshold is established for the VFS3/MOD pressure and the R pressure applied to the high clutch C2. This defines a variable engagement control range where the high clutch C2 is controlled by VFS3-MOD pressure instead of R pressure. This is shown in the graph of FIG. 7a. This variable control range permits an optimized matching of the input torque and speed with high clutch capacity or with VFS3-MOD pressure to accomplish smooth reverse engagements. The variable engagement control range is calculated as follows:

Variable Control Range=VFS2 Control Range−FS/Avalve

A summary of the reverse and forward engagements now will be provided. The reverse and forward engagements are entirely controlled by three variable force solenoids, which are identified as the VFS1 solenoid, VFS2 solenoid, and VFS3 solenoid. The VFS1 solenoid in conjunction with the pressure modulator valve for forward drive and the forward engagement control valve controls the forward clutch capacity during forward engagement. VFS3 pressure, in conjunction with a pressure modulator valve for reverse and a reverse engagement control valve, controls the high clutch capacity during reverse engagement. VFS2 pressure defines the engagement control range for the reverse and forward engagements. VFS1 and VFS2 amplify the line pressure, thereby providing enough input pressure to the modulator valves for reverse and forward as well as to the VFS3 solenoid.

By multiplexing the engagement control functions for the variable force solenoids, an optimized reverse and forward engagement control is achieved. The control system allows a fast response time, which is achieved by the individual variable force solenoid pressure settings for the high clutch and the forward clutch during forward and reverse engagements. High quality high speed and high torque forward and reverse engagements can be achieved by the variable pressure threshold functions for the clutch pressures and the line pressure. This is accomplished by the VFS2 solenoid.

A neutral idle function is obtained by applying the forward clutch with minimum capacity to reduce load on the engine. This enables an increase in fuel economy. The neutral idle function is accomplished also by VFS1/MOD capacity control for the forward clutch and by distributing VFS1/MOD pressure to the forward clutch by the control of variable force solenoid VFS2 and variable force solenoid VFS3 pressure settings.

Modifications to the control valve system herein described may be made by persons skilled in the automatic transmission art without departing from the scope of the invention as defined by the following claims. These claims are intended to cover all such modifications as well as equivalents thereof.

What is claimed is:

1. A control valve system for an automatic transmission for an automotive vehicle having gear elements defining multiple ratio torque delivery paths between an engine and a driven member under the control of an electronic controller that is responsive to operating variables of the engine and transmission;

fluid pressure-operated clutches and brakes for establishing and disestablishing said torque delivery paths;

a pressure source;

a fluid pressure delivery circuit connecting said pressure source to said clutches and brakes including a pressure regulator valve means for maintaining a circuit pressure to establish torque transmitting capacity of said clutches and brakes;

one of said clutches being located on the torque input side of one of said gear elements during forward drive and a second of said clutches being located on the torque input side of another of said gear elements during reverse drive;

a driver-operated manual valve means in said circuit for delivering said circuit pressure to said control system and said one clutch to effect start-up clutch engagement;

first and second solenoid-operated valve means in said circuit communicating respectively with said one clutch and said second clutch to establish a variable clutch apply pressure, said first solenoid operated valve means communicating also with said pressure regulator valve means for establishing a variable circuit pressure; and a modulator valve means in said circuit between said solenoid-operated valve means and said one clutch for effecting a controlled rate of build-up of torque transmitting capacity of said one clutch during said start-up clutch engagement.

2. A control valve system for a multiple ratio transmission for an automotive vehicle having gear elements that define a forward drive torque flow path and a reverse drive torque flow path under the control of an electronic controller that responds to engine and transmission operating variables;

a first fluid pressure-operated clutch means for establishing and disestablishing said forward drive torque flow path and a second fluid pressure-operated clutch means for establishing and disestablishing said reverse drive torque flow path;

a fluid pressure source;

a fluid pressure delivery circuit connecting said pressure source to each of said clutch means including a pressure regulator valve means for maintaining a regulated circuit pressure to establish torque transmitting capacity of said clutch means;

one of said clutch means being located on the torque input side of said forward drive torque flow path and a second of said clutch means being located on the torque input side of said reverse drive torque flow path for respectively establishing and disestablishing said forward and reverse drive torque flow paths;

a first solenoid-operated valve means in said circuit responsive to output driver signals of said controller and communicating with said one clutch means for establishing a variable clutch apply pressure and with said pressure regulator valve means for establishing a variable circuit pressure;

a second solenoid-operated valve means communicating with said second clutch means for establishing a variable clutch apply pressure;

first and second modulator valve means in said circuit between said first and second solenoid-operated valve means respectively, for modulating said regulated circuit pressure to effect a controlled rate of build-up of torque transmitting capacity of said first and second clutch means during sign-up engagement of said first and second clutch means;

a forward drive engagement control valve means in said circuit between said first modulator valve means and said one clutch means for distributing first clutch pressure to said one clutch means;

a reverse drive engagement control valve means in said circuit between said second modulator valve means and said second clutch means for distributing second clutch pressure to said second clutch means during start-up engagement of said second clutch means;

a third solenoid-operated valve means in said circuit communicating with said forward and reverse drive engagement control valve means for developing a variable pressure to actuate said forward and reverse drive engagement control valve means during engagement intervals for said first and second clutch means, thereby controlling the range of engagement pressures applied on said first and second clutch means.

3. The control valve system as set forth in claim 2 wherein said third solenoid-operated valve means communicates with said pressure regulator valve means to effect a modified circuit pressure output from said pressure regulator valve means.

4. The control valve system as set forth in claim 2 wherein said automatic transmission has a hydrokinetic torque converter between said engine and said gear elements, said torque converter having an impeller driven by the engine and a turbine connected to a turbine shaft, said turbine shaft being situated in said forward drive torque flow path;

said second solenoid-operated valve means and said third solenoid-operated valve means communicating with said forward drive engagement control valve means for establishing a modified pressure force on said forward drive engagement control valve means, said forward drive engagement control valve means being actuated to effect distribution of said variable pressure to said first clutch means whereby a neutral idle function is established as marginal capacity of said first clutch means is established.

5. The control valve system as set forth in claim 1 wherein each of said solenoid-operated valve means is a variable force solenoid valve means.

6. The control valve system as set forth in claim 2 wherein each of said solenoid-operated valve means is a variable force solenoid valve means.

7. A control valve system for an automatic transmission for an automotive vehicle having gear elements defining multiple ratio torque delivery paths between an engine and a driven member under the control of an electronic controller that is responsive to operating variables of the engine and transmission;

fluid pressure-operated clutches and brakes for establishing and disestablishing said torque delivery paths;

a pressure source:

a fluid pressure delivery circuit connecting said pressure source to said clutches and brakes including a pressure regulator valve means for maintaining a circuit pressure to establish torque transmitting capacity of said clutches and brakes;

one of said clutches being located on the torque input side of one of said gear elements during forward drive and a second of said clutches being located on the torque input side of another of said gear elements during reverse drive;

a driver-operated manual valve means in said circuit for delivering said circuit pressure to said control valve system and said one clutch to effect start-up clutch engagement;

first and second solenoid-operated valve means in said circuit communicating respectively with said one clutch and said second clutch to establish a variable clutch apply pressure, said first solenoid operated valve means communicating also with said pressure regulator valve means for establishing a variable circuit pressure:

a modulator valve means in said circuit between said first solenoid-operated valve means and said one clutch for effecting a controlled build-up of torque transmitting capacity of said one clutch during said start-up clutch engagement; and a forward drive engagement control valve means in said circuit between said Modulator valve means and said one clutch means for distributing first clutch pressure to said one clutch means during start-up engagement of said first clutch means:

a third solenoid-operated valve means in said circuit communicating with said pressure regulator valve means and said forward drive engagement control valve means for developing a variable pressure to actuate said forward drive engagement control valve means during engagement intervals for said first clutch means, thereby controlling the range of engagement pressures applied on said first clutch means.

8. The control valve system as set forth in claim 7 wherein each of said solenoid-operated valve means is a variable force solenoid valve means.

* * * * *